United States Patent
Coverstone

(10) Patent No.: US 8,437,771 B1
(45) Date of Patent: May 7, 2013

(54) PARENTAL CONTROL OF ACCESS TO INFORMATION FROM A COMPUTER SYSTEM

(76) Inventor: Thomas E. Coverstone, Hallsville, TX (US)

( * ) Notice: Subject to any disclaimer, the term of this patent is extended or adjusted under 35 U.S.C. 154(b) by 200 days.

(21) Appl. No.: 12/338,978

(22) Filed: Dec. 18, 2008

Related U.S. Application Data

(62) Division of application No. 10/020,094, filed on Dec. 13, 2001.

(60) Provisional application No. 60/255,331, filed on Dec. 13, 2000.

(51) Int. Cl.
*H04W 24/00* (2009.01)

(52) U.S. Cl.
USPC ............ 455/456.1; 455/411; 455/414.1; 455/418; 455/419; 455/420; 455/456.2; 455/456.3; 455/456.5; 455/456.6; 455/457; 370/310.2; 370/328; 709/217; 709/225

(58) Field of Classification Search ............ 455/411, 455/414.1, 418–420, 456.1–457; 370/310.2, 370/328; 709/217, 225
See application file for complete search history.

(56) References Cited

U.S. PATENT DOCUMENTS

| | | |
|---|---|---|
| 3,673,318 A | 6/1972 | Olsen et al. |
| 3,859,457 A | 1/1975 | Kirk, Jr. |
| 3,919,462 A | 11/1975 | Hartung et al. |
| 3,919,479 A | 11/1975 | Moon |
| 4,068,264 A | 1/1978 | Pires |
| 4,114,139 A | 9/1978 | Boyd et al. |
| 4,215,366 A | 7/1980 | Davidson |
| 4,225,884 A | 9/1980 | Block et al. |
| 4,229,765 A | 10/1980 | Sanger |
| 4,245,245 A | 1/1981 | Matsumoto |
| 4,266,098 A | 5/1981 | Novak |
| 4,280,139 A | 7/1981 | Mogi |
| 4,325,078 A | 4/1982 | Seaton |
| 4,331,974 A | 5/1982 | Cogswell |

(Continued)

FOREIGN PATENT DOCUMENTS

| | | |
|---|---|---|
| AU | 536261 | 5/1982 |
| AU | 80145-82 | 10/1982 |

(Continued)

OTHER PUBLICATIONS

Rae Atkey, "How You Can Censor Your Child's TV Viewing," The News Editorial (Adelaide), Aug. 25, 1986, Adelaide, Australia.

(Continued)

*Primary Examiner* — Steve D Agosta
(74) *Attorney, Agent, or Firm* — McAndrews, Held & Malloy, Ltd.

(57) ABSTRACT

A user of a wireless device logs onto the computer system via the wireless device, a land based telephone, a computer, or other communication means via the Internet, land based telephone lines, or other communication devices. The user identifies himself or herself by the logging on process and then communicates with the computer system by inputting certain information into computer screens. Parents will have certain controls available to them to either preselect what their children will have access to at a subsequent log on or will be able to prevent their children from having access to certain material. After the user logs on to the system, the user will be able to determine what communications he or she will receive.

20 Claims, 6 Drawing Sheets

U.S. PATENT DOCUMENTS

| | | | |
|---|---|---|---|
| 4,333,110 A | 6/1982 | Faerber et al. | |
| 4,338,628 A | 7/1982 | Payne et al. | |
| 4,348,696 A * | 9/1982 | Beier | 725/29 |
| 4,354,201 A | 10/1982 | Sechet et al. | |
| 4,375,651 A | 3/1983 | Templin et al. | |
| 4,386,436 A | 5/1983 | Kocher et al. | |
| 4,398,193 A | 8/1983 | Kuniyoshi et al. | |
| 4,425,579 A | 1/1984 | Merrell | |
| 4,484,217 A | 11/1984 | Block et al. | |
| 4,488,179 A | 12/1984 | Kruger et al. | |
| 4,510,623 A | 4/1985 | Bonneau et al. | |
| 4,520,404 A | 5/1985 | Von Kohorn | |
| 4,528,588 A | 7/1985 | Lofberg | |
| 4,528,589 A | 7/1985 | Block et al. | |
| 4,530,008 A | 7/1985 | McVoy | |
| 4,536,791 A | 8/1985 | Campbell et al. | |
| 4,554,584 A | 11/1985 | Elam et al. | |
| 4,588,857 A | 5/1986 | Arsem | |
| 4,591,664 A | 5/1986 | Freeman | |
| 4,595,950 A | 6/1986 | Lofberg | |
| 4,598,288 A | 7/1986 | Yarbrough et al. | |
| 4,600,921 A | 7/1986 | Thomas | |
| 4,602,297 A | 7/1986 | Reese | |
| 4,605,964 A | 8/1986 | Chard | |
| 4,605,973 A | 8/1986 | Von Kohorn | |
| 4,620,229 A | 10/1986 | Amano et al. | |
| 4,633,297 A | 12/1986 | Skerlos et al. | |
| 4,670,857 A | 6/1987 | Rackman | |
| 4,685,131 A * | 8/1987 | Horne | 380/241 |
| 4,695,904 A | 9/1987 | Shinyagaito et al. | |
| 4,696,034 A | 9/1987 | Wiedemer | |
| 4,718,107 A | 1/1988 | Hayes | |
| 4,729,044 A | 3/1988 | Kiesel | |
| 4,750,213 A | 6/1988 | Novak | |
| 4,768,229 A | 8/1988 | Benjamin et al. | |
| 4,787,063 A | 11/1988 | Muguet | |
| 4,814,883 A | 3/1989 | Perine | |
| 4,837,623 A | 6/1989 | Motoyama | |
| 4,888,796 A * | 12/1989 | Olivo, Jr. | 379/101.01 |
| 4,896,354 A | 1/1990 | Inagaki et al. | |
| 4,930,158 A | 5/1990 | Vogel | |
| 4,930,160 A | 5/1990 | Vogel | |
| 4,939,596 A | 7/1990 | Takayama et al. | |
| 5,408,683 A | 4/1995 | Ablay et al. | |
| 5,461,390 A | 10/1995 | Hoshen | |
| 5,530,232 A | 6/1996 | Taylor | |
| 5,572,221 A | 11/1996 | Marlevi | |
| 5,742,915 A | 4/1998 | Stafford | |
| 5,749,052 A * | 5/1998 | Hidem et al. | 455/406 |
| 5,774,802 A | 6/1998 | Tell et al. | |
| 5,809,415 A * | 9/1998 | Rossmann | 455/422.1 |
| 5,835,722 A * | 11/1998 | Bradshaw et al. | 709/225 |
| 5,852,775 A | 12/1998 | Hidary | |
| 5,938,721 A | 8/1999 | Dussell et al. | |
| 5,948,041 A | 9/1999 | Abo et al. | |
| 5,959,577 A | 9/1999 | Fan et al. | |
| 5,999,126 A | 12/1999 | Ito | |
| 5,999,912 A | 12/1999 | Wodarz | |
| 6,026,369 A | 2/2000 | Capek | |
| 6,026,375 A | 2/2000 | Hall et al. | |
| 6,047,327 A * | 4/2000 | Tso et al. | 709/232 |
| 6,070,147 A | 5/2000 | Harms et al. | |
| 6,073,005 A | 6/2000 | Raith et al. | |
| 6,098,048 A | 8/2000 | Dashefsky et al. | |
| 6,101,483 A | 8/2000 | Petrovich et al. | |
| 6,115,596 A | 9/2000 | Raith et al. | |
| 6,123,259 A | 9/2000 | Ogasawara | |
| 6,137,878 A * | 10/2000 | Vonder Haar et al. | 379/361 |
| 6,172,640 B1 | 1/2001 | Durst et al. | |
| 6,177,905 B1 | 1/2001 | Welch | |
| 6,178,407 B1 * | 1/2001 | Lotvin et al. | 705/14.73 |
| 6,208,866 B1 | 3/2001 | Rouhollahzadeh et al. | |
| 6,266,612 B1 | 7/2001 | Dussell et al. | |
| 6,324,269 B1 * | 11/2001 | Malik | 379/114.23 |
| 6,327,570 B1 | 12/2001 | Stevens | |
| 6,330,543 B1 | 12/2001 | Kepecs | |
| 6,389,337 B1 | 5/2002 | Kolls | |
| 6,418,462 B1 | 7/2002 | Xu | |
| 6,472,976 B1 | 10/2002 | Wohl | |
| 6,505,046 B1 | 1/2003 | Baker | |
| 6,539,430 B1 * | 3/2003 | Humes | 709/225 |
| 6,564,327 B1 * | 5/2003 | Klensin et al. | 726/7 |
| 6,571,279 B1 | 5/2003 | Herz et al. | |
| 6,611,687 B1 | 8/2003 | Clark et al. | |
| 6,618,593 B1 | 9/2003 | Drutman et al. | |
| 6,647,257 B2 | 11/2003 | Owensby | |
| 6,654,800 B1 | 11/2003 | Rieger, III | |
| 6,677,894 B2 | 1/2004 | Sheynblat et al. | |
| 6,684,240 B1 * | 1/2004 | Goddard | 709/217 |
| 6,731,940 B1 | 5/2004 | Nagendran | |
| 6,819,919 B1 | 11/2004 | Tanaka | |
| 6,831,896 B1 | 12/2004 | Lempiö et al. | |
| 6,912,398 B1 | 6/2005 | Domnitz | |
| 7,106,843 B1 * | 9/2006 | Gainsboro et al. | 379/191 |
| 7,136,915 B2 | 11/2006 | Rieger, III | |
| 7,668,832 B2 | 2/2010 | Yeh et al. | |
| 7,680,796 B2 | 3/2010 | Yeh et al. | |
| 2002/0022488 A1 | 2/2002 | Srinivasan et al. | |
| 2002/0073421 A1 * | 6/2002 | Levitan et al. | 725/28 |
| 2002/0077130 A1 | 6/2002 | Owensby | |
| 2002/0193122 A1 | 12/2002 | Coverstone | |
| 2008/0059300 A1 | 3/2008 | Hamoui | |
| 2009/0199107 A1 | 8/2009 | Lewis et al. | |
| 2010/0036710 A1 | 2/2010 | Ames | |
| 2010/0049585 A1 | 2/2010 | Mcintyre et al. | |
| 2010/0070758 A1 | 3/2010 | Low et al. | |
| 2010/0082397 A1 | 4/2010 | Blegen | |

FOREIGN PATENT DOCUMENTS

| | | |
|---|---|---|
| AU | 5675786 | 11/1986 |
| EP | 0112575 A1 | 7/1984 |
| EP | 0112575 B1 | 3/1986 |
| EP | 0053885 A2 | 7/1986 |
| GB | 1424739 | 2/1976 |
| GB | 2062401 A | 5/1981 |
| GB | 8138341 | 7/1986 |
| GB | 2206759 A | 1/1989 |
| GB | 2206759 B | 1/1992 |
| JP | 59-210782 | 11/1984 |

OTHER PUBLICATIONS

Wikipedia: Location based advertising, Wikipedia.org, Nov. 4, 2009, 4 pages, Wikimedia Foundation, San Francisco, CA.

Genasys to leverage GyPSii OpenExperienceO API for killer mobile social app. Feb. 12, 2010, 3 pages, Genasys, Amsterdam, The Netherlands, lbszone.com, Spatial Media, LLC, Washington D.C.

Navteq, LocationPoint Advertising Selected by Nobex Technologies Hyper-targeted, location aware advertising inventory available on Nobex Radio Companion, Press Center, Feb. 15, 2010, corporate. navteq.com/webapps.

Butcher, Dan, Apple blocks location-based in-app advertising, Feb. 18, 2010, 4 pages, mobilemarketer.com/cms/newsladvertising/5430. print, Mobile Marketer, New York, NY, USA.

Taylor, Marisa, In-Car Navigation on the Phone, Wall Street Journal, Feb. 20, 2010, 2 pages, Wsj.com, New York, NY, USA.

What we do—Community & Entertainment, web page, download Feb. 23, 2010, one page, genasys.com, Genasys, Madrid, Spain.

What we do—Proximity Info. And Advertising, web page, download Feb. 23, 2010, one page, genasys.com, Madrid, Spain.

Facts about Google's acquisition of Admob, web page, download Feb. 23, 2010, one page, google.com, Google, Mountain View, CA.

Facts about Google's acquisition of Admob, Frequently Asked Questions, web page, download Feb. 23, 2010, two pages, google.com, Google, Mountain View, CA.

Alvarez, Mark, the Most Popular Location-Based App isn't Foursquare, it's MyTown, L'Atelier, Feb. 25, 2010, 3 pages, San Francisco, CA, USA.

Siegler Mg, Apple Gets Location Fever Too in the App Store, TechCrunch, Mar. 17, 2010, techcrunch.com/2010103/17, California, USA.

TechCrunch, Adverse to Adverts? Mobclix's SDK Brings Targeted Advertisements To The iPad, web page, download, Mar. 18, 2010, 4 pages, ismashphone.com/2010103/18, California, USA.

Ankeny, Jason, Google: One in three mobile searches has local intent, web page, download, Mar. 22, 2010, one page, FierceWireless.com.

Roa, Leena, NileGuide Unveils New Location-Based iPhone App for Travel Recommendations on the Go, TechCrunch, Mar. 23, 2010, techcrunch.com/2010/03/23, California, USA.

Mandese, Joe, Apple Poised to Unveil 'iAD,' New Mobile Ad Platform Is Jobs Next Big Thing', MediaPost News, Mar. 26, 2010, mediapost.com/publications, New York, NY, USA.

Spence, Nick, Rumour: Apple 'iAd' mobile ad platform coming soon?, MacWorld.co.uk, Mar. 29, 2010, macworld.co.uk/mac/news, London, UK.

Justin, Bluetooth Proximity Marketing Does Work, Here's Three Successful Case Studies, web page download, Apr. 6, 2010, 4 pages, www.mobilemarketingwatch.com.

Kincaid, Jason, Apple Announces iAd Mobile Advertising Platform, TechCrunch, Apr. 8, 2010, techcrunch.com/2010104/08, California, USA.

Apple, Inc., Apple Previews iPhone Os 4, Press Release, Apr. 8, 2010, 5 pages, Apple, Inc.

Acuity Mobile eMAP, web page downloaded Apr. 13, 2010, 2 pages, Acuity Mobile, Washington, DC.

Acuity Mobile 5 Dimensions of Spot Relevance, web page downloaded Apr. 13, 2010, 2 pages, Acuity Mobile, Washington, DC.

Navteq, Media Solutions, Apr. 7, 2010, accessed on navteqmedia.com/pressroom/video.

NAVTEQ, Media Solutions, Apr. 7, 2010, accessed on navteqmedia.com/pressroomivideo (transcript).

Bernhard Koelmel, Elba-03-1.1-Elba, Oct. 16,2003, 17 pages, 3G European Location Based Advertising, Information Society Technologies Programme, Brussels, Belgium.

Porak, Anatol, Location Based Advertising Overview English, Elba, Mar. 16, 2004, 17 pages, Information Society Technologies Programme, Brussels, Belgium.

Dimpfel et al., Integration & Content. Elba, Jan. 30, 2004, 22 pages. Information Society Technologies Programme. Brussels. Belgium.

Aalto et al., Bluetooth and Wap Push Based Location-Aware Mobile Advertising System, MobiSYS' 04, Jun. 6, 2004, 10 pages, 2004 Conference, Association for Computing Machinery, New York, NY, USA.

Murphy, David, in Search of Spot Relevance, Mobile Marketing Magazine, Jul. 13, 2007, 2 pages, United Kingdom.

Navteq bought by Nokia for 5.7 billion, accessed on yourNAV.com, Oct. 12, 2007, 3 pages.

Catone, Josh, Companies Betting on Location Based Mobile Ads, Feb. 6, 2008, 2 pages, ReadWriteWeb.com.

O'Sullivan, Cian, Navteq unveils location-based mobile advertising service, Jan. 12, 2009, 2 pages, GoMoNews. Com.

Nokia, Nokia Q4 2008 Financial Highlights, Press Release, Jan. 22, 2009, 17 pages, presse.nokia.at, Nokia, Germany.

Microsoft Advertising Announces Eight New Mobile Partners, Press Release, Barcelona, Spain, Feb. 16, 2009, 2 pages, Microsoft Corporation, Redmond, Washington.

Xiam Technologies Advances Technologies to put Recommendations on the Map, Feb. 20, 2009, 3 pages, Qualcomm Inc., Dublin, Ireland.

T-Mobile, T-Mobile uses innovative Bluetooth technology to drive footfall, Press Release, Mar. 24, 2009, 2 pages, mobiadnews.com, T-Mobile, London, UK.

T-Mobile, T-Mobile to Trial Proximity Marketing in Uk Stores, Press Release, Mar. 29, 2009, 2 pages, mobiadnes. corn, T-Mobile, London, UK.

Harnick, Chris, Navteq to serve location-based ads in Nextar GPS system, Aug. 31, 2009, 2 pages, mobilemarketer.com/cms/news/search/4047.print, Mobile Marketer, New York, NY, USA.

Gannes, Liz, Mobilize: The Dawn of Location-Aware Mobile Ads, Sep. 10, 2009, 4 pages, GigaOM. San Francisco, CA.

NAVTEQ Acquires Acuity Mobile, Web page downloaded Sep. 14, 2009, 2 pages, Acuity Mobile, Washington, DC.

Navteq Acquires Acuity Mobile, Acquisition Expands Existing Location Based Advertising Capabilities, Press Release, Sep. 14, 2009, 2 pages, Acquity Mobile, Chicago, IL.

Ricketts, Camille, Nokia's Navteq buys Acuity Mobile for location-based advertising, Sep. 15, 2009, 4 pages, VentureBeat, San Francisco, CA.

Ricketts, Camille, Nokia's NAVTEQ buys Acuity Mobile for location-based advertising, Sep. 15, 2009, 4 pages, accessed on digital.venturebeat.com/2009/09/15, DigitalBeat, San Francisco, CA, USA.

Google, Google to Acquire AdMob, Press Release, Nov. 2, 2009, 2 pages, accessed on google.com/press/pressre1/20091109_admob, Google, Mountain View, CA.

Acuity Mobile Company Overview, accessed on accuitymobile.com, Nov. 4, 2009, 2 pages, Acuity Mobile, Washington, DC.

Acuity Mobile eMAP Mobile Advertising Platform, accessed on accuitymobile.com, Nov. 4, 2009, 2 pages, Acuity Mobile, Washington, DC.

Acuity Mobile eMAP Key Benefits, accessed on accuitymobile.com, Nov. 4, 2009, 2 pages, Acuity Mobile, Washington, DC.

Acuity Mobile AisleCaster, accessed on accuitymobile.com, Nov. 4, 2009, 2 pages, Acuity Mobile, Washington, DC.

Acuity Mobile Spot Relevance, accessed on accuitymobile.com, Nov. 4, 2009, 2 pages, Acuity Mobile, Washington, DC.

Acuity Mobile, Inc., Company Overview, BusinessWeek, Nov. 4, 2009, 3 pages, Bloomberg L.P., New York, NY.

Google to Acquire AdMob, Press Release, Nov. 9, 2009, 2 pages, Google, Mountain View, CA.

Hof, Richard, Why Google is buying AdMob, BusinessWeek, Nov. 9, 2009, 2 pages, Bloomberg L.P., New York, NY.

Ferraro, Ric, Google Acquires Admob, what say you, Mobile?, Nov. 9, 2009, 2 pages, accessed on moverge. blogspot.com.

Schonfield, Erick, Admob is "Approaching a $100 Million" Run Gate, Google Thinks it can be Billions, Nov. 9, 2009, 2 pages, Techcrunch.com, San Francisco, CA.

RIM Announces New Services Platform for Blackberry Developers, Press Release, Nov. 9, 2009, 3 pages, Research in Motion.

Arghire, Ionut, Rim Brings New Services to BlackBerry App World, Softpedia, Nov. 10, 2009, 2 pages, Softpedia, Bucuresti, Romania.

Horowitz, Etan, Disney Verizon app will allow users to check wait times, plan for events, Nov. 10, 2009, 11 pages, 36 accessed on thedailydisney.com/blog/2009/11/disney-mobile-verizon-app-will-allow-users-to-check-wait-times-planfor events, Disney, Orlando, FL, USA.

Smith, Thomas, Mobile Magic—First Disney Parks Mobile App Now Available, Nov. 11, 2009, 13 pages, accessed on disneyparks.disney.go.com/blog/2009/11111, Disney Blog, Orlando, FL, USA.

Azure Mayan, Intera Bluetooth Proximity Marketing and In-Store Analytics Services, Press Release, May 5, 2009, 2 pages, Intera Communications Corporation, Pleasanton, CA.

Kane, Yukariiwatani, Apple's Quattro Deal Pressures Google, the Wall Street Journal, Jan. 6, 2010, 2 pages, accessed on Wsj.com, New York, NY, USA.

Laughlin, Stephen, "Apple acquires Ad Firm Quattro for $275 Million," Jan. 6,2010, accessed on stephenlaughlin.posterous.com.

The Official Ticket Center, Mobile Magic from Walt Disney World, accessed on blog.officialticketcenter.com, Jan. 15, 2010, 6 pages, The Official Ticket Center, Orlando, FL, USA.

Reardon, Marguerite, Nokia takes on Google with free navigation app, Signal Strength, Jan. 21, 2010, 4 pages, CNET News, San Francisco, CA, USA.

Jones et al., Nokia's 'Free' Navigation Creates Contextual Opportunities, Gartner Research Publication G00174023, Jan. 22, 2010, Gartner Inc., Stamford, CT.

Harnick, Chris, "Opera acquires AdMarvel to ramp up mobile advertising," Mobile Marketer, Jan. 22, 2010, 2 pages, accessed on mobilemarketer.com, Mobile Marketer, New York, NY.

Ankeny, Jason, Verizon Wireless introduces VZ Navigator 5.0, Fierce Mobile Content, Feb. 1, 2010, 3 pages, accessed on FierceMobileContent.com.

iPhone Developer Program, App Store Tip: Enhance Your App with Core Location, accessed on Developer.Apple.com, Feb. 3, 2010, 2 pages, Apple, Cupertino, CA, USA.

Quattro Wireless, Home web page, accessed on quatrowireless.com. downloaded Feb. 9, 2010, one page, Quattro Wireless, Waltham, MA.

Quattro Wireless, Targeting Ad Serving, web page, downloaded Feb. 9, 2010, one page, Quattro Wireless, Waltham, MA.

Clark et al., Apple Note Signals Move to Claim Context-Aware Advertising, Gartner Research Publication G00174454, Feb. 10, 2010, Gartner Inc., Stamford, CT.

Steiniger et al., Foundations of Location Based Services, 2006, 28 pages, University of Zurich, Zurich, Switzerland. As early as Jan. 1, 2006.

Bruner and Kumar, Attitude toward Location-Based Advertising, Journal of Interactive Advertising, vol. 7, No. 2, Mar.-Jun. 2007, 15 pages, American Academy of Advertising, aaasite.org.

* cited by examiner

PARENTAL CONTROL OF ACCESS TO INFORMATION FROM A COMPUTER SYSTEM

RELATED APPLICATIONS

This patent application is a divisional of U.S. patent application Ser. No. 10/020,094 filed Dec. 13, 2001, entitled System and Method for Wireless Telecommunications Network, incorporated herein by reference. This patent application claims the benefit of U.S. Provisional Patent Application Ser. No. 60/255,331 filed on Dec. 13, 2000, and entitled System and Method for Wireless Telecommunications Network, incorporated herein by reference.

BACKGROUND OF THE INVENTION

1. Field of the Invention

The present invention relates to parental control of access to information from a computer system, for example, using a wireless telecommunications network wherein information relating to a communication device is stored and processed.

2. Background of the Invention

Typical wireless networks allow for two way telecommunications between multiple users utilizing communication devices, such as handsets or PDAs communicating with at least one base station. Advances in wireless telecommunications will soon provide a user location feature by locating a wireless communication device, for example, during an emergency. Such a feature typically utilizes a Global Positioning Satellite (GPS) system which has the capability of tracking the movements of each specific wireless communication device, such as a cellular telephone handset or PDA and its user. As GPS technology improves, the specific location of the cellular telephone handset and its user will be accurate within a few feet, or even less.

SUMMARY OF THE INVENTION

In one embodiment of the present invention, a user of a wireless device logs onto the computer system via the wireless device, a land based telephone, a computer, or other communication means via the Internet, land based telephone lines, or other communication devices. The user identifies himself or herself by the logging on process and then communicates with the computer system by inputting certain information into computer screens. It will appreciated that parents will have certain controls available to them to either preselect what their children will have access to at a subsequent log on or will be able to prevent their children from having access to certain material. After the user logs on to the system, the user will be able to determine what communications he or she will receive.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Figure 1:
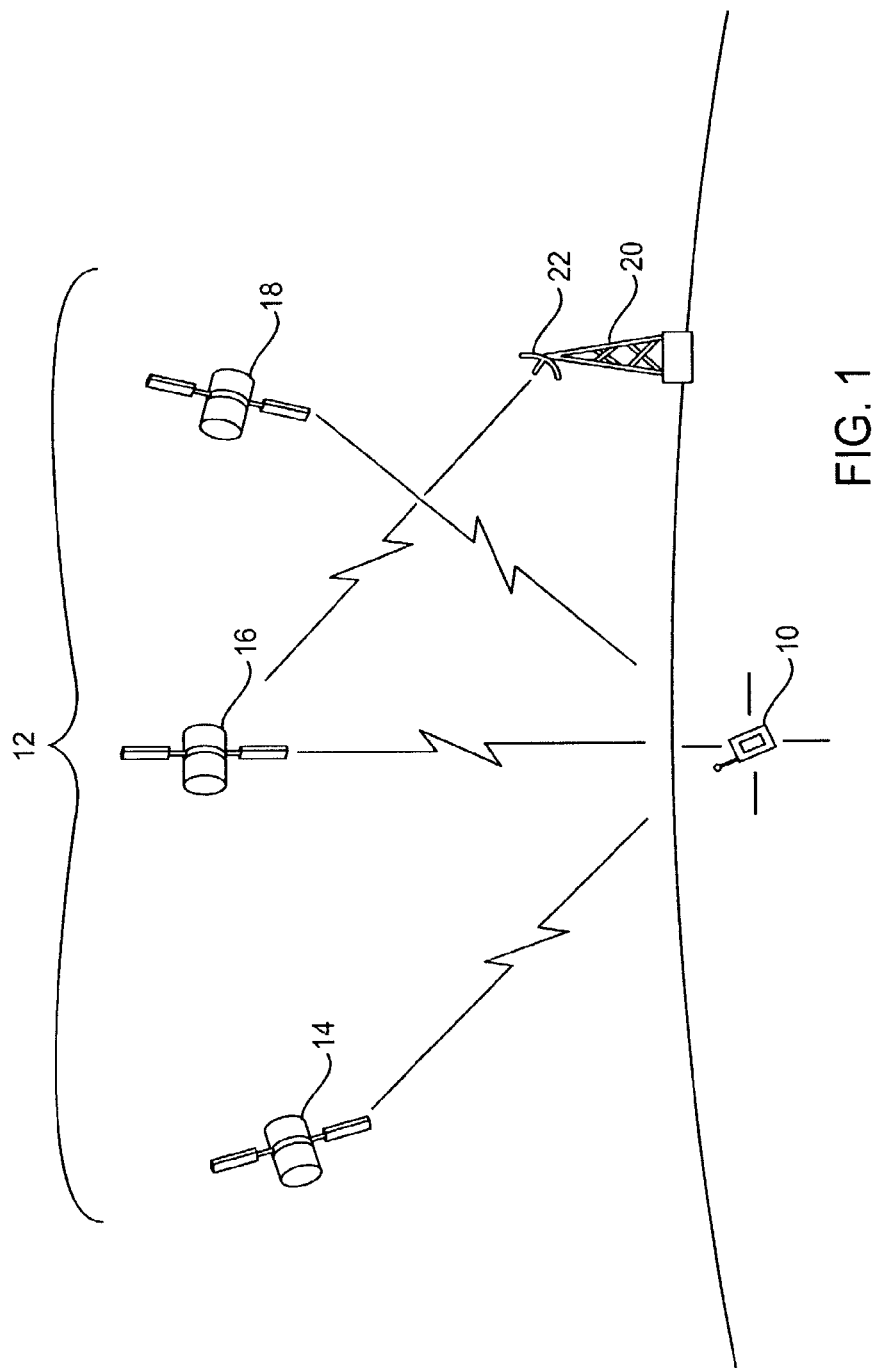
FIG. 1 illustrates a schematic representation illustrating an exemplary wireless telecommunications network.

FIG. 1 illustrates an exemplary GPS system with a wireless device, such as a cellular wireless handset or PDA device 10 in communication with a GPS system 12, wherein the system 12 typically includes a plurality of satellites 14, 16 and 18, and a ground station 20 with a transmitter and receiver 22. The satellites communicate with the handset 10 and with each other to determine the location of the device 10 and the user. The terms communication device and user may be used interchangeably herein. It will be understood by those skilled in the art that any type of GPS system would work with the present invention. In addition, the GPS system 12 has the capability to identify the communication device 10 by various methods, such as coding the communications from a particular handset to the GPS system.

The GPS system 12 locates and identifies a particular user. The GPS ground station may include a computer system, or the computer system may be independent of the ground station. For example, the computer system may be housed in a separate satellite, a separate ground based system, or may be embedded in at least one of the satellites, as long as the computer system is in communication with the GPS system via a communication interface.

The components in the telecommunication system may interface utilizing a cellular based system, digital cellular system, GSM (Global System for Mobile communications), PCS (Personal Communication Services), PDC (Personal Digital Cellular), radio communications, satellite communications, or other related systems. Also, the Wireless Application Protocol (WAP) may be utilized as well as the Bluetooth Wireless Technology Standard, or other short wireless standards may be utilized in the present invention.

Figure 2:
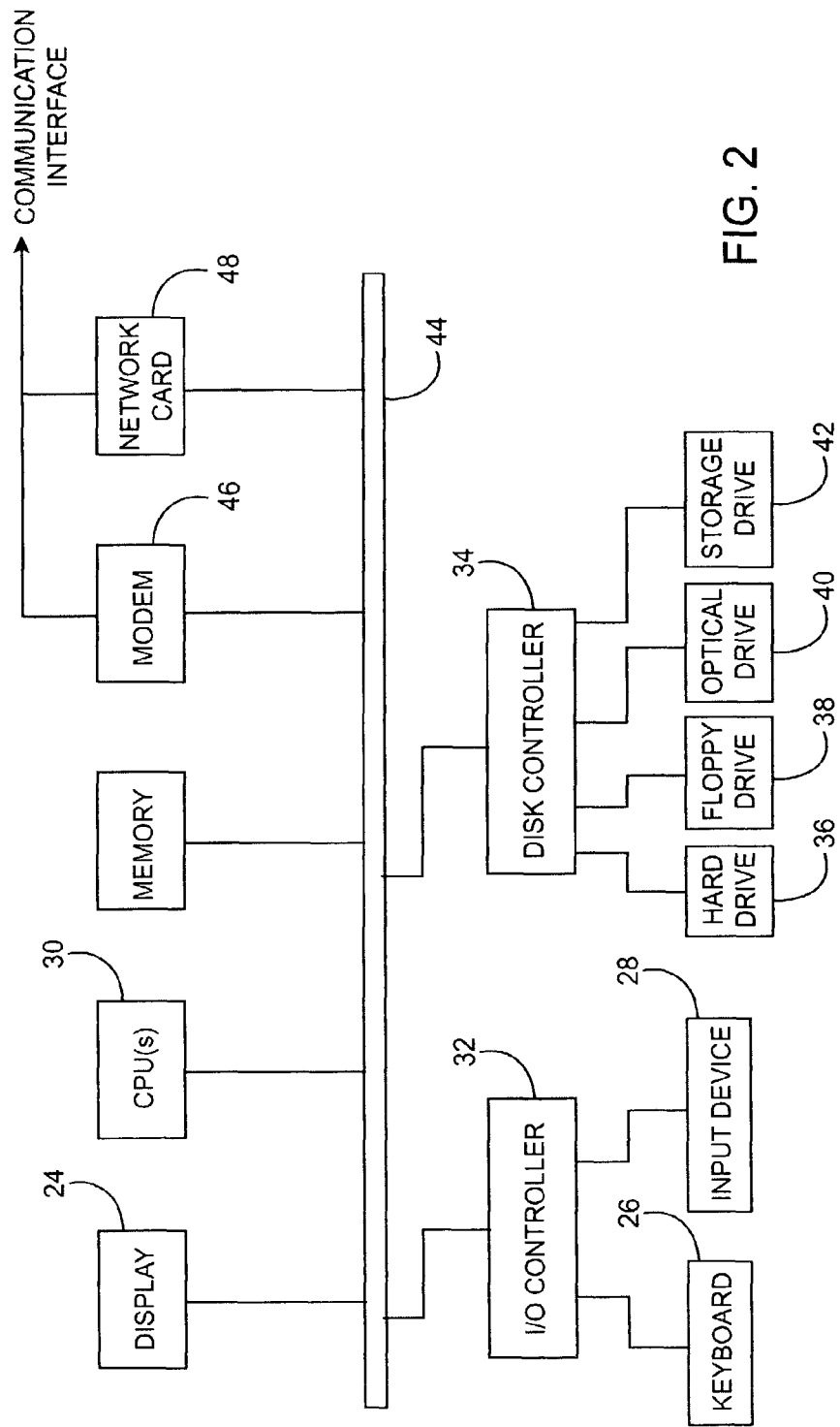
FIG. 2 is a block diagram illustrating an example of a computer system used to implement the present invention.

The computer system, as shown in FIG. 2, may include a display 24, a keyboard 26, input device 28, central processing unit(s) 30, 1/O controller 32, disk controller 34, hard drive 36, floppy drive 38, optical drive 40, and a storage device 42. The storage device can be configured as memory or another processor readable medium. Each of the devices communicates over bus 44. The computer is not limited to these generally devices or software since the computer will include other computer devices and/or software based upon the system configuration.

In one example, the computer interfaces with the communication interface via a modem 46, a network card 48 or some other communication mechanism, such as cellular or satellite communications.

Figure 3:
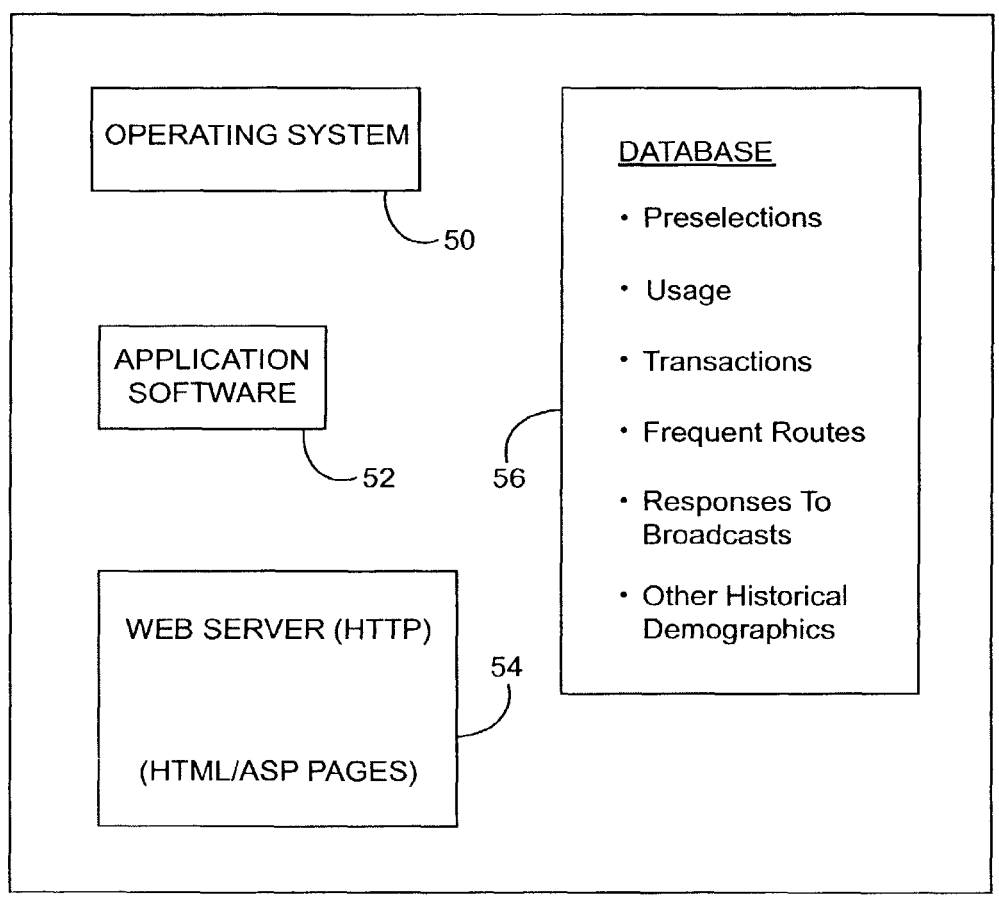
FIG. 3 is a block diagram illustrating an example of a system configuration used to implement the present invention.

FIG. 3 is an example of the system configuration of the server system used to implement the present invention. The server system includes an operating system 50, application software 52, a web server (http server) 54, and a database system 56. The database system 56 may include several databases or files, including preselections, usage, transactions, frequent or frequented routes, responses to broadcasts, or requests for information, or other historical demographics.

Figure 4:
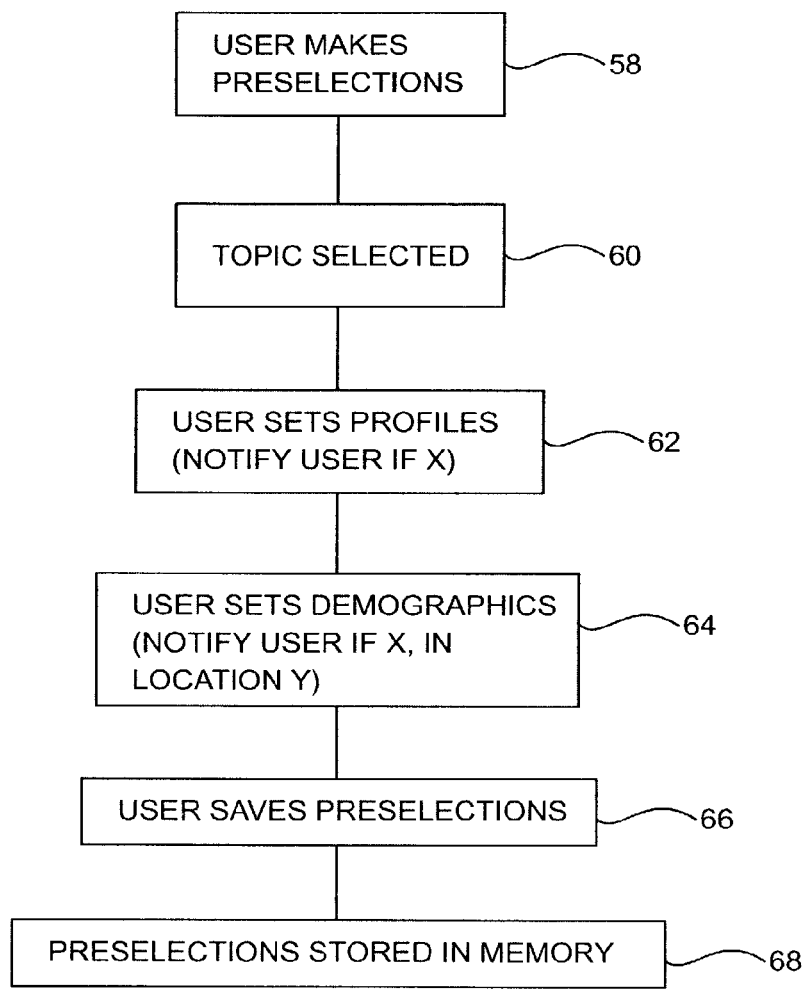
FIG. 4 is a flow chart illustrating a communication device user preselection process.

As shown in FIG. 4, the user of the communication device makes preselections 58 from a menu. These preselections initially establish a baseline demographic for this particular user of the communication device. At step 60 the user selects a topic to make the preselections, such as food, entertainment, shopping, social, or other interested categories available on the menu. The user may utilize a menu on the communication device itself or the selection process may be Web based. At step 62, the user sets particular profiles of interest in the selected category, such as notify the user by broadcasting to the communication device if a certain event happens. The event may be that the user is in the proximity of a store, restaurant, person, event, or other item selected by the user. At step 64, the user may set certain demographics, such as notify the user if the user is in the proximity of a store, such as within five miles, or within a certain zip code, or city, or some other geographical limitation. At step 66 the user saves the preselections. At step 68 the preselections are stored in memory either in the communication device, or preferably, in the computer system of the telecommunication network.

Figure 5:
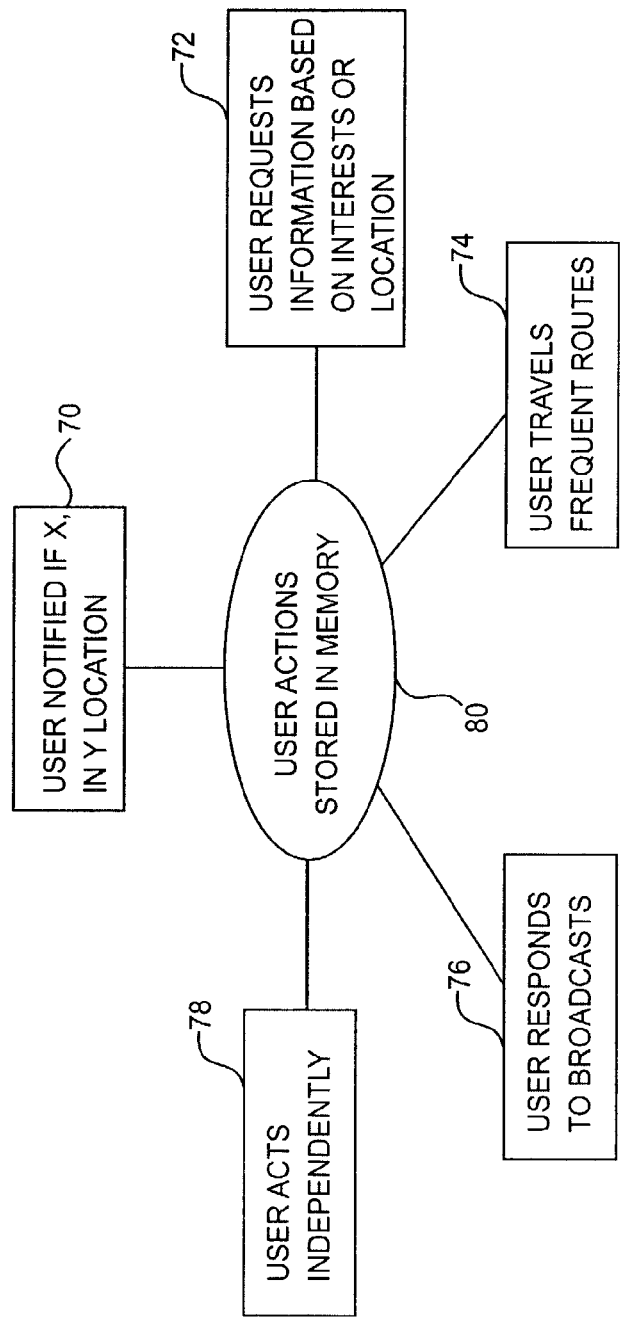
FIG. 5 is a flow chart illustrating a communication device user usage pattern as tracked.

FIG. 5 illustrates how the user's actions, or inactions are stored in memory to compile, maintain, and update the historical demographics and database relating to the user. At step 70, the user is notified based on presetections made. The user's actions or inactions are stored at step 80 based upon the notification of the preselected event. Other actions or inactions include step 72, where the user requests information based on interests not preselected or based on the user's location. At step 74 the user travels frequent or frequented routes and these actions are stored into memory. At step 76, the user responds to broadcasts from the telecommunication system and the user's actions are stored into memory. At step 78, the user acts independently, such as making a visiting or making a purchase at a store. Purchases by the user are stored when the user utilizes the communication device to make the purchase. Bluetooth technology or other short distance wireless communication standards allow the communication device to make purchases.

In one embodiment of the present invention, a user of a device logs onto the computer system via the device, a land based telephone, a computer, or other communication means via the Internet, land based telephone lines, or other communication devices. The term device and handset are also used interchangeably herein. The user identifies himself or herself by the logging on process and then communicates with the computer system by inputting certain information into computer screens. It will appreciated that parents will have certain controls available to them to either preselect what their children will have access to at a subsequent log on or will be able to prevent their children to have access to certain material. After the user logs on to the system, the user will be able to determine what communications he or she will receive. For example, the user may select to receive advertisements from certain stores and/restaurants, or select from other categories of interest such as concerts, grocery stores, department stores, specialty stores libraries, parks et cetera so that when the handset is within a certain distance or range from the area of interest, an advertisement or message from the area of interest will be broadcast on the handset, either by voice, ring, or message on the handset screen.

The user also may select that he wishes to receive a message when he is in a certain distance of another person or persons who have the same selected interest. For example, a male looking for a female, who is looking for a male. These examples are not exhaustive of the potential lists of matches that could be preselected on the computer system and then executed when the users are in different environments. Of course, for the communication to be executed by the computer system, all participants must have preselected to receive such communications. For example, in the case people looking for other people, both must have preselected that they were willing to communicate with people of their respective categories. In another embodiment, certain users may not preselect whom they will receive communications from. For example, for users who desire to have a free wireless service, the trade off may be that they cannot screen or preselect who they will receive communications or broadcasts from.

After the user preselects the areas of interest, the user then establishes a pattern of usage by receiving messages, responding to the messages by either ignoring them or acting upon them, and such usage, responses and lack thereof are recorded by the computer system in the database for each particular user. The device uploads data to the computer system by a variety of methods. For example, the GPS system monitors the whereabouts of the user and determines if the user has responded to an advertisement by going to one of the places that was preselected and an advertisement was sent. In the alternative, the advertisement may send a teaser advertisement to the user wherein the user must respond to obtain the full advertisement, such as a percentage off or to obtain the address of the advertiser and may poll the user whether the user actually went to the advertiser's location. Another alternative is for the advertisers to have short wave communication systems in place, such as a BLUETOOTH enabled system, so that when the user enters the advertiser's place of a business, the device communicates with the BLUETOOTH enabled system and the database is then updated of the user's actions. It will be recognized that utilizing this technology, a user does not have to preselect a certain establishment, but may be included in a demographic group by just visiting an establishment. This method allows the demographic group to include registered as well as nonregistered users. Also, purchases made with a handset or via a handset may be tracked.

After the database is updated regarding the users responses to certain advertisements, a demographic profile of the user or a particular handset is developed in the computer system 20 utilizing the data in database. Of course, such a demographic profile is very valuable and could be sold to various merchants or advertisers who the user would be a likely customer of. Also, based on the user's or handset's profile, the advertisements may be altered to provide a higher success rate of execution or follow through on the advertisement. For example, if a user has positively responded to certain advertisements in the past to an establishment, subsequent advertisements may include further discounts, such as a frequent user discount that is displayed on the user's screen or a frequent user discount that is left in the user's voicemail box with a code that may be used for redemption. The advertisements or redemptions may be proportionate to the need of a user's inventory or business cycle.

For example, if a particular restaurant is slow on Wednesdays, advertisements may be broadcast to a select group of users or handsets based on the demographic profiles for special pricing on Wednesdays. Another advantage is that custom advertisements for certain groups of users that have been compiled may be quickly broadcast based on business conditions. For example, using the restaurant case study again, if a restaurant is having a slow night that might not typically be a slow night, a broadcast could be sent to a certain group of frequent users/diners. Another example could include if the restaurant has an oversupply of food that needs to be sold versus being discarded. The system disclosed may also be utilized by broadcasting specials and asking for a response to make reservations or to make a purchase. It will be appreciated that the restaurant example is exemplary only and is not intended to be a limitation; the disclosed method and system can be utilized in endless situations. It will also be appreciated that the customized broadcasts may be either proportional or reversely proportional based on the user's history. For example, an establishment may reward frequent usage by providing more frequent or greater discounts for frequent purchasers. In the alternative, more frequent or greater discounts may be provided to first timers to get them into the establishments with the discounts becoming less frequent or for lesser amounts once more frequent usage is established. Of course the broadcast discounts may be increased if usage is determined to be diminished. An advantage is that each user may be tracked and broadcasts sent to the user's handset based on the user's responses to past broadcasts and subsequent behavior.

The disclosed first embodiment includes any analysis or manipulation of the user's history to customize certain broadcasts to the user or handset. It will be appreciated by those skilled in the art that the user's history may be analyzed in several ways. To list just a few, the user's history may be analyzed based on geographic history, chronological history, user family history in the case of multiple users for a handset, seasonal history, usage patterns either in serial or parallel, et cetera.

Figure 6:
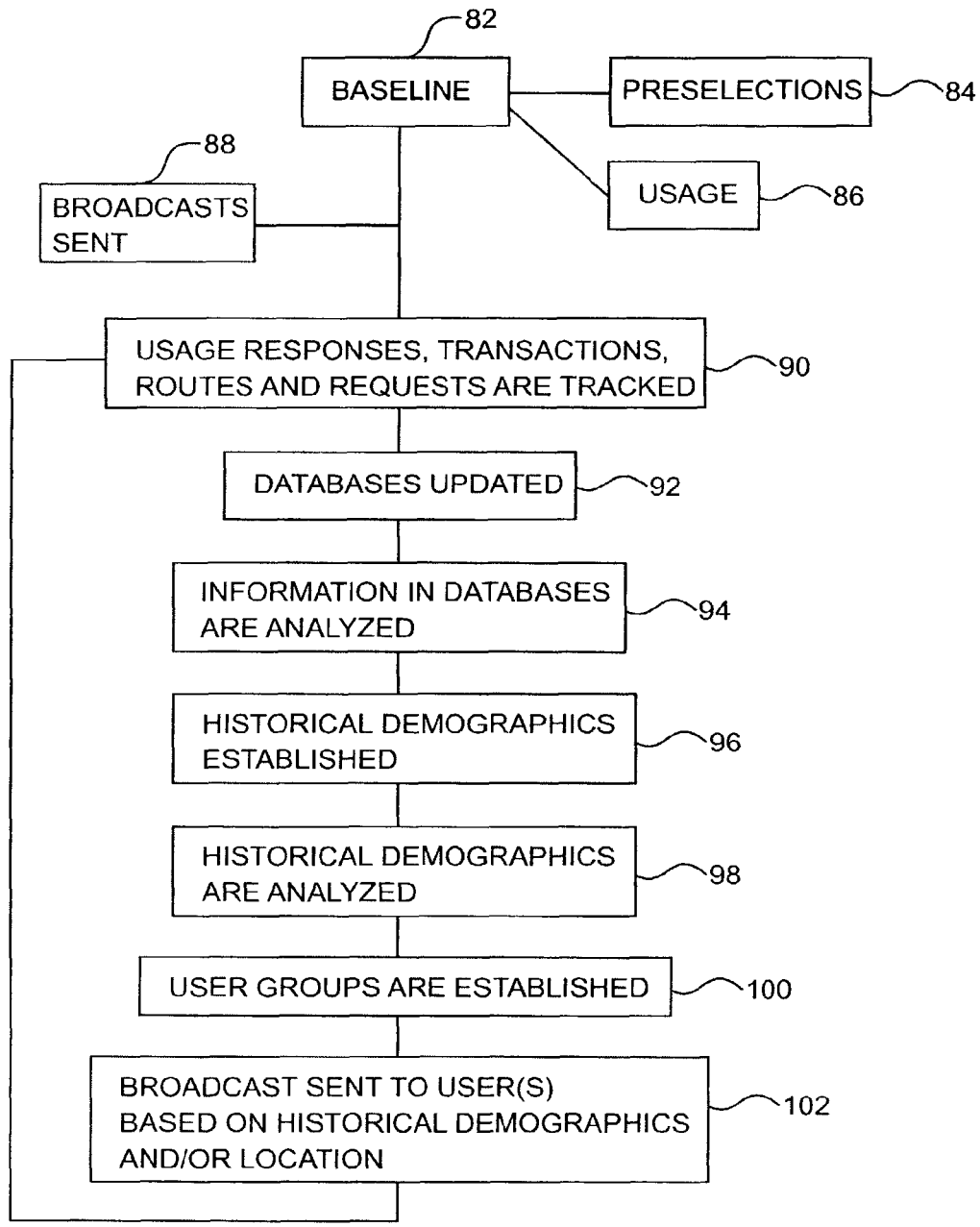
FIG. 6 is a flow chart illustrating the tracking and usage analysis of the communication device as well as the resulting targeted broadcasting to the communication device.

FIG. 6 illustrates a flow chart according to an embodiment of the present invention. At step 82 a baseline is established for a user or handset based on preselections 84 made by the user making selections regarding broadcasts that he is interested in receiving or by starting with usage 86, if any, of the handset which is tracked. In step 88 broadcasts are sent to the handset based on selections made or based on a set of defaults or based on usage at step, if any. The usage of handset is subsequently tracked in step 90, usage meaning locations of the handset, purchases made with the handset, and communications made with the handset, as well as other methods to track usage. The database is updated in step 92 based on the usage of the handset. In step 94 information in the databases are analyzed or filtered. In step 96 a historical demographic is established based on the usage of the handset. In step 98 the demographic is analyzed to recognize patterns in said usage, whether the patterns are in responses to broadcasts sent to the handset or not. In step 100 user groups are established based on the demographics analyzed. This allows broadcasts to be sent to specific user groups. In step 102 broadcasts are sent to users based on the demographics established and analyzed. The process then continues by looping back to step 90 with the usage being tracked. This method establishing a very accurate demographic profile as a function of time and the tracking of usage. This method allows the demographic profile to be modified as the user's tastes and preferences change.

Other features of the present invention could include the demographic profile being stored on a computer so that as the user changes handsets do to upgrades, breakage, or loss, the profile may be easily switched to another handset by simply logging onto to the computer system or by the handset or network's customer service personnel.

Another example is the present invention could be used to create a dynamic marketplace for placing orders for advertisements, that are based on availability. For example, if an establishment has an oversupply, broadcasts could be placed to a user or a user group and a purchase could be made with the device and an account could be charged. Therefore, based on availability, prices for advertisements and goods would fluctuate in real time. Goods could also be auctioned. Also, frequent advertisers and purchasers could be rewarded with discounts.

While the invention is being described in detail with reference to the preferred embodiments thereof it will be apparent to one skilled in the art that various changes and modifications can be made and equivalents employed, without departing from the present invention.

What is claimed is:

1. A computer system, comprising:
a memory configured to store user selections; and
a processor coupled to the memory, wherein the processor is configured to
identify a parent to the computer system by logging the parent onto the computer system,
receive certain information from the parent when the parent inputs the certain information into the computer system,
provide the parent with a control configured to select what a child of the parent will have access to from a cell phone,
receive from the parent a selection of what the child will have access to from the cell phone, wherein the control configured to select what the child of the parent will have access to from the cell phone comprises providing the parent with categories of interest to allow the child to receive messages via the cell phone from a business related to one or more of the categories of interest, and
control access of the child to information from the cell phone in accordance with the selection of the parent to prevent the child from having access to certain material,
wherein the processor is configured to provide the parent with a selection to allow the child to receive messages via the cell phone from the business when the cell phone is in proximity of an area of interest, and
wherein the processor is coupled to a cellular telephone system configured to log the parent onto the computer system when the parent operates another cell phone in the cellular telephone system.

2. The computer system of claim 1, wherein the processor is configured to provide the categories of interest to allow the child to receive messages from a business related to the selection when the cell phone is in proximity of an area of interest.

3. The computer system of claim 1, wherein the processor is configured to provide the parent with the categories of interest to allow the child to receive messages from a business related to a selected category of interest when the cell phone is in proximity of the business.

4. The computer system of claim 1, wherein the proximity of the area of interest is a user-selectable distance that is determined by GPS.

5. The computer system of claim 1, wherein the processor is configured to log on the parent to identify the parent to the computer system via communication with a cell phone operated by the parent.

6. The computer system of claim 1, wherein the processor is configured to log on the parent to identify the parent to the computer system via the Internet, and the processor is configured to communicate with the parent by the parent inputting the certain information into at least one computer screen.

7. The computer system of claim 1, wherein the memory and the processor are part of a server system that includes a web server, wherein the server system uses the web server to receive the selection from the parent via the another cell phone.

8. The computer system of claim 1, wherein the memory and the processor are part of a server system that is in communication with the cell phone via the cellular telephone system and an Internet.

9. The computer system of claim 1, wherein the cell phone is configured to receive the messages via Bluetooth communications from a location of the business.

10. The computer system of claim 1, wherein the cell phone is configured to receive the messages via short-wave radio communications from a location of the business.

11. The computer system of claim 1, wherein the processor is configured to track purchases made with the cell phone at the business.

12. A computer system, comprising:
a memory configured to store user selections; and
a processor coupled to the memory, wherein the process is configured to
identify a parent to the computer system by logging the parent onto the computer system,
receive certain information from the parent when the parent inputs the certain information into the computer system,
provide the parent with a control configured to select what a child of the parent will have access to from a cell phone,
receive from the parent a selection of what the child will have access to from the cell phone, wherein the control configured to select what a child of the parent will have access to from the cell phone comprises receiving from the parent a selection of a certain business to allow the child to receive messages via the cell phone from the certain business, and
control access of the child to information from the cell phone in accordance with the selection of the parent to prevent the child from having access to certain material,
wherein the processor is configured to provide the parent with a selection to allow the child to receive messages vie the cell phone from the certain business when the cell phone is in proximity of the certain business, and
wherein the processor is coupled to a cellular telephone system configured to log the parent onto the computer system when the parent operates another cell phone in the cellular telephone system.

13. The computer system of claim 12, wherein the proximity of the certain business is a user-selectable distance that is determine by GPS.

14. The computer system of claim 12, wherein the processor is configured to log on the parent to identify the parent to the computer system via communication with another cell phone operated by the parent.

15. The computer system of claim 12, wherein the processor is configured to log on the parent to identify the parent to the computer system via the Internet, and the processor is configured to communicate with the parent by the parent inputting the certain information into at least one computer screen.

16. The computer system of claim 12, wherein the processor is coupled to a cellular telephone system for logging the parent onto the computer system when the parent operates the cell phone in the cellular telephone system.

17. The computer system of claim 12, wherein the memory and the processor are part of a server system that includes a web server, wherein the server system uses the web server to receive the selection from the parent via the another cell phone.

18. The computer system of claim 12, wherein the memory and the processor are part of a server system that is in communication with the cell phone via the cellular telephone system and an Internet.

19. The computer system of claim 12, wherein the cell phone is configured to receive the messages via Bluetooth communications from a location of the certain business.

20. The computer system of claim 12, wherein the processor is configured to track purchases made with the cell phone at the certain business.

\* \* \* \* \*

UNITED STATES PATENT AND TRADEMARK OFFICE
CERTIFICATE OF CORRECTION

| | | |
|---|---|---|
| PATENT NO. | : 8,437,771 B1 | Page 1 of 1 |
| APPLICATION NO. | : 12/338978 | |
| DATED | : May 7, 2013 | |
| INVENTOR(S) | : Coverstone | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 373 days.

Signed and Sealed this
Eleventh Day of November, 2014

Michelle K. Lee
*Deputy Director of the United States Patent and Trademark Office*